United States Patent [19]

Harada et al.

[11] Patent Number: 5,057,220

[45] Date of Patent: Oct. 15, 1991

[54] PROCESS FOR TREATING WASTE WATER

[75] Inventors: Yoshiaki Harada, Tsuzuki; Kenichi Yamasaki, Gose, both of Japan

[73] Assignee: Osaka Gas Company Limited, Osaka, Japan

[21] Appl. No.: 569,906

[22] Filed: Aug. 20, 1990

[30] Foreign Application Priority Data

Aug. 18, 1989 [JP] Japan .................................. 1-213987

[51] Int. Cl.$^5$ .......................... C02F 11/08; C02F 1/74
[52] U.S. Cl. .................................. 210/605; 210/623; 210/630; 210/631; 210/762; 210/903
[58] Field of Search ............... 210/603, 605, 612, 614, 210/620, 623, 626, 627, 630, 631, 741–743, 761–763, 766, 903

[56] References Cited

U.S. PATENT DOCUMENTS

| 3,256,179 | 6/1966 | Teletzke | 210/761 |
| 3,959,125 | 5/1976 | Teletzke | 210/612 |
| 3,977,966 | 8/1976 | Pradt et al. | 210/17 |
| 4,141,828 | 2/1979 | Okada et al. | 210/762 |
| 4,203,838 | 5/1980 | Shimizu et al. | 210/761 |
| 4,294,706 | 10/1981 | Kakihara et al. | 210/762 |
| 4,654,149 | 3/1987 | Harada et al. | 210/763 |
| 4,699,720 | 10/1987 | Harada et al. | 210/762 |
| 4,751,005 | 6/1988 | Mitsui et al. | 210/762 |
| 4,764,900 | 8/1988 | Schwoyer et al. | 210/603 |

FOREIGN PATENT DOCUMENTS

| 664656 | 5/1965 | Belgium . |
| 802361 | 1/1984 | Belgium . |
| 224905 | 6/1987 | European Pat. Off. . |

Primary Examiner—Thomas Wyse
Attorney, Agent, or Firm—Larson and Taylor

[57] ABSTRACT

The invention provides processes for treating waste water comprising subjecting waste water to liquid phase oxidation without catalyst, liquid phase oxidation with catalyst and anaerobic digestion and/or aerobic treatment.

34 Claims, 2 Drawing Sheets

PROCESS FOR TREATING WASTE WATER

INDUSTRIAL APPLICATION OF THE INVENTION

This invention relates to a process by which waste water containing at least two kinds of components among suspended solids (hereinafter referred to as "SS"), ammonia and chemically oxidizable substance (hereinafter referred to as "COD components") is subjected to a combination of wet oxidations, anaerobic process and/or aerobic process.

PRIOR ART AND ITS PROBLEMS

For the control of water quality, it has been thought increasingly important in recent years to remove from waste water nitrogen components (particularly ammonia nitrogen) as well as COD components. In view of such situation, we conducted various experiments and extensive research and developed practical processes for treating waste water which are capable of decomposing the COD components and ammonia contained in the waste water for removal (Japanese Examined Patent Publications Nos. 42992/1981, 42391/1982, 33320/1982, 27999/1983, 19757/1984, 19757/1984, 29317/1984 and 49073/1984, U.S. Pat. Nos. 4,141,828, 4,294,706, 4,699,720, etc.). However, when waste water to be treated contains SS in a concentration of as high as about 500 ppm to tens of thousands ppm, the unreacted SS (including sludge) tend to deposit on the surface of catalyst particles packed in the treating apparatus, resulting in, for example, increased pressure loss and reduced activity of catalyst. Accordingly it is necessary to remove SS partly or wholly from the waste water prior to the treatment depending on the concentration and composition of the solids.

The above treatments tend to entail another disadvantage. Since the sludge components in the waste water are markedly decomposed by the liquid phase oxidation in the presence of a catalyst, a high temperature and/or pressure must be employed and an increased amount of catalyst must be packed in the reactor depending on, e.g. the kind of waste water, concentration of sludge components in the waste water and the desired degree of water quality. Consequently the treatments may be economically disadvantageous.

Japanese Examined Patent Publication No. 25838/1988 discloses a process in which waste water to be treated is subjected to anaerobic treatment after liquid phase oxidation in the presence of an oxygen-containing gas. The process, however, has the following problem. Components which are difficult to decompose biologically, such as high-molecular weight substances, remain in the treated water after liquid phase oxidation, and ammonia and like nitrogen-containing compounds can not be decomposed. Thus the process requires an additional step of treating these components.

When waste water containing SS in a high concentration is treated by a biological treatment process currently in wide use, the treatment is carried out after removing the major portion of SS, or the solids are withdrawn after treatment as excess sludge from the treating apparatus and disposed of by incineration, fusion, dumping into sea, landfill or the like or utilized as a fertilizer. The overall amount of sewage industrially and municipally produced from the treatment of waste water and the waste from sewage treatment plants is increasing year after year. To overcome this problem, it is desired to find out a measure for minimizing the amount of sludge produced or to be treated and to develop an effective method for treating with economical feasibility the sludge being continuously accumulated.

MEANS FOR SOLVING THE PROBLEMS

In view of the state of the art, we continued research efforts to improve the aforesaid prior art techniques in an attempt to devise processes for treating waste water which are capable of simultaneously decomposing the suspended solids in a high concentration as well as the other components contained in the waste water. Our continued research has revealed that the object can be achieved by combining a liquid phase oxidation in the absence of catalyst, a liquid phase oxidation in the presence of catalyst supported by a particulate or granular carrier and a biological process. This invention has been accomplished based on this finding.

According to the present invention, there are provided:

(I) a process for treating waste water by wet oxidations which contains at least two components among suspended solids, ammonia and COD components, the process comprising the steps of;

(i) subjecting waste water to liquid phase oxidation in the absence of a catalyst and in the presence of an oxygen-containing gas, (ii) subjecting the treated water from the step (i) to liquid phase oxidation in the presence of an oxygen-containing gas and a catalyst supported by a granular carrier and comprising at least one of iron, cobalt, manganese, nickel, ruthenium, rhodium, palladium, iridium, platinum, copper, gold and tungsten and compounds thereof insoluble or sparingly soluble in water, (iii) subjecting the treated water from the step (ii) to anaerobic digestion by anaerobic methane fermentation, and (iv) returning the excess sludge from the step (iii) to the step (i) (hereinafter referred to as "process I"), (II) a process for treating waste water by wet oxidations which contains at least two components among suspended solids, ammonia and COD components, the process comprising the steps of;

(i) subjecting waste water to liquid phase oxidation in the absence of a catalyst and in the presence of an oxygen-containing gas, (ii) subjecting the treated water from the step (i) to liquid phase oxidation in the presence of an oxygen-containing gas and a catalyst supported by a granular carrier and comprising at least one of iron, cobalt, manganese, nickel, ruthenium, rhodium, palladium, iridium, platinum, copper, gold and tungsten and compounds thereof insoluble or sparingly soluble in water, (iii) subjecting the treated water from step (ii) to aerobic treatment by an activated sludge method, and (iv) returning the excess sludge from the step (iii) to the step (i) (hereinafter referred to as "process II"), and (III) a process for treating waste water by wet oxidations which contains at least two components among suspended solids, ammonia and COD components, the process comprising the steps of; (i) subjecting waste water to liquid phase oxidation in the absence of a catalyst and in the presence of an oxygen-containing gas, (ii) subjecting the treated water from the step (i) to liquid phase oxidation in the presence of an oxygen-containing gas and a catalyst supported by a granular carrier and comprising at least one of iron, coblat, manganese, nickel, ruthenium, rhodium, palladium, iridium, platinum, copper, gold and tungsten and compounds thereof insoluble or sparingly soluble in water, (iii) subjecting the treated water from the step (ii) to anaerobic digestion by anaerobic methane fermentation, and (iv) subjecting the treated water from the step (iii) to aerobic treatment by an activated sludge method, and (v) returning the excess sludge from the steps (iii) and (iv) to the step (i) (hereinafter referred to as "process III").

The ammonia contained in the waste water to be treated by the processes of the present invention includes ammonium compounds capable of forming ammonium ions when dissociated in water. The COD components present in the waste water to be treated in the present invention include phenols, cyanides, thiocyanides, oils, thiosulfuric acid, sulfurous acid, sulfides, nitrous acid, organic chlorine compounds (trichloroethylene, tetrachloroethylene, tri-chlorethane, methylene chloride, etc.) and the like. The term "suspended solids" used throughout the specification and the appended claims refers to the substances specified in JIS K 0102, suspended solids prescribed for the sewage test method by Japan Municipal Water Association and other combustible solids (e.g. sulfur).

The processes of the invention are suitable for treating waste water containing two or three kinds of the foregoing components (ammonia, suspended solids and COD components). Examples of such waste water are sewage sludge, concentrated liquid of sewage sludge, sludge from industrial waste water, human waste, waste water resulting from desulfurization and from removal of cyanide, gas liquor from coal gasification and liquefaction processes, waste water from heavy oil gasification process, waste water produced in food processing plants, waste water produced in alcohol manufacturing plants, waste water discharged from chemical plants, biomass in wet state, etc. to which, however, the waste water to be treated by the processes of the invention is in no way limited.

The process of the invention will be described below in detail.

(1) Process I

In the first step of the process I (hereinafter referred to as "step I-(i)"), the waste water to be treated is subjected to liquid phase oxidation in the presence of an oxygen-containing gas without a catalyst. Examples of oxygen-containing gases are air, oxygen-enriched gases, oxygen and oxygen-containing waste gases such as those containing at least one of hydrogen cyanide, hydrogen sulfide, ammonia, sulfur oxides, organic sulfur compounds, nitrogen oxides, hydrocarbons, etc. The oxygen-containing gas is supplied in an amount corresponding to about 1 to about 1.5 times, preferably about 1.05 to about 1.2 times, the theoretical amount of oxygen required for the oxidation of the whole amounts of ammonia, suspended solids and COD components in the waste water (or in the waste water and waste gas) to nitrogen, carbon dioxide, water and the like. The use of an oxygen-containing waste gas as the source of oxygen is advantageous in that the harmful components in the gas can be rendered harmless along with those contained in the waste water. If the absolute amount of oxygen present in the oxygen-containing gas used is insufficient, the gas is replenished with oxygen by supplying air, oxygen-enriched air or oxygen per se. The oxygen-containing gas need not be fed wholly to the waste water in the step I-(i) and may be supplied as distributed to the step I-(i) and the subsequent step. For example, the oxidation reaction in the step I-(i) can usually decompose about 10 to about 90% of suspended solids, about 10 to about 60% of COD components and up to about 15% of ammonia so that an oxygen-containing gas may be sent to the step I-(i) in an amount corresponding to about 0.4 to about 0.8 times the theoretical oxygen amount, leaving the remaining amount for further feed to the subsequent step. The reaction in the step I-(i) is carried out at a temperature of usually about 100° to about 370° C., preferably about 200 to about 300° C. With the increase in reaction temperature, the oxygen content in the gas to be fed and reaction pressure, the decomposition efficiency of the components is increased with solubilization of suspended solids, the residence time of waste water in the reactor is reduced, and the reaction conditions in the subsequent step is rendered moderate, but the installing cost rises. Accordingly the reaction temperature and other conditions are determined in view of the kind of waste water, reaction conditions of subsequent step, desired degree of treatment and overall operating and installing costs all combined. The reaction pressure is such that the waste water can at least retain its liquid phase at the predetermined temperature. The reaction time is variable depending on the size of the reactor, the water quality of waste water, temperature, pressure and other factors, etc., but usually in the range of about 15 to about 120 minutes, preferably about 30 to about 60 minutes. The reaction time is much shorter than the liquid phase oxidations described in the prior art literature such as the above-mentioned Japanese Examined Patent Publication No. 19757/1984. The shorter reaction time attained in the invention is attributable to the biological treatment performed in the processes of the invention.

Subsequently in the second step of the process I (hereinafter referred to as "step I-(ii)", the water from the step I-(i) is subjected again to liquid phase oxidation in the presence of a catalyst supported on a granular carrier. Examples of active components of useful catalysts are iron, cobalt, manganese, nickel, ruthenium, rhodium, palladium, iridium, platinum, copper, gold, tungsten and compounds thereof insoluble or sparingly soluble in water such as oxides thereof, ruthenium dichloride, platinum dichloride and like chlorides, ruthenium sulfide, rhodium sulfide and like sulfides, etc. At least one of them is supported on the carrier. The active components of the catalyst are used as supported in a conventional manner by alumina, silica, silica-alumina, titania, zirconia, activated carbon or like particulate or granular carriers, nickel, nickel-chromium, nickel-chromium-iron or like metallic porous particulate or granular carriers. The term "granular" used herein includes various shapes such as globules, pellets, cylinders, crushed fragments, powders, etc. The amount of the active components to be supported by the carrier is not specifically limited but usually about 0.05 to about 25% by weight, preferably about 0.5 to about 3% by weight, based on the weight of the carrier. All catalysts to be used in the present invention as well as the catalyst useful in the step I-(ii) car be prepared by conventional methods, for example, by causing a carrier to support the active component of catalyst thereon or by mixing a material for the active component of catalyst with a carrier material, shaping the mixture into the desired shape, drying the shaped body, reducing the same if required, and baking it. The reactor column has a volume such that the waste water is passed therethrough at a space velocity of about 0.5 to about 12 l/hr, preferably about 1.0 to about 4 l/hr, based on an empty column. When the required oxygen amount is supplied wholly to the waste water in the step I-(i) as stated above, an oxygen-containing gas need not be fed in the step I-(ii). In other words, only when the required oxygen amount is supplied partly in the step I-(i), the oxygen-containing gas is fed in an amount corresponding to the remaining oxygen amount to the step I-(ii). The reaction temperature in the step I-(ii) is usually about 100° to about 370° C., preferably about 200° to about 300° C. The reaction pressure is such that the waste water can at least retain its liquid phase at the predetermined temperature. The reaction time in the step I-(ii) is variable depending on the kind of waste water to be treated, reaction temperature, pressure and the like. If the reaction time is excessively extended, even the organic material to be fermented in the anaerobic methane fermentation at the ensuing step is completely oxidized to carbon dioxide gas. Thus, care should be taken to retain carboxylic acid of 5 carbon atoms or less. In this way, SS and COD components are at least partly decomposed in the step I-(ii) and the high-molecular weight substances and biologically scarcely decomposable substances in the remaining portions of the SS and COD components are reduced in molecular weight to convert themselves into substances easily decomposable by bacteria and high in reaction rate during anaerobic methane fermentation or aerobic treatment by activated sludge method. The ammonia is substantially decomposed.

The waste water treated in the step I-(ii) may contain a decomposition product such as sodium sulfate and the like. If the decomposition product from the step I-(ii) is likely to decrease the efficiency of treatment in the subsequent step for anaerobic digestion, the water is fed from the step I-(ii) in a pressurized state directly to a reverse osmosis equipment wherein the water is separated into clear water and concentrated liquid. The clear water can be reused for a variety of applications, e.g. as industrial water and the like, and concentrated liquid can be mixed with the starting waste water for treatment according to the process of the invention, or can be processed for recovery of sodium sulfate or like useful materials. When the treated water contains incombustible ash, the ash is separated by a ultrafilter, membrane filter, sedimentation separator or the like before the water is sent to the next step.

In the third step (iii) of the process I (hereinafter referred to as "step I-(iii)"), the treated water from the step I-(ii) is subjected to digestion by conventional anaerobic methane fermentation method. In this treatment, the temperature of warm treated water from the step I-(ii) is effectively utilized for the anaerobic fermentation, whereby a highly efficient high-temperature fermentation can be conducted economically and the biologically easily decomposable substance produced in the preceding step can be treated in a short time. While the treatment conditions in the step I-(iii) are not specifically limited, usually the treating temperature is about 35° to about 60° C., the digesting time is about 1 to about 30 days, and the concentration of sludge is about 2 to about 5%.

The excess sludge from the step I-(iii) is returned to the step I-(i) in the fourth step in the process I (hereinafter referred to as "step I-(iv)") wherein the sludge is treated again as mixed with the waste water to be treated in this step.

(2) Process II

In the first step of the process II (hereinafter referred to as "step II-(i)"), the waste water to be treated is subjected to liquid phase oxidation in the absence of a catalyst and in the presence of an oxygen-containing gas under the same conditions as those in the step I-(i).

A catalyst is used in the second step of the process II (hereinafter referred to as "step II-(ii)"). Examples of catalysts useful in this step include the same as those usable in the step I-(ii). The reaction conditions in the step II-(ii) can also be the same as those in the step I-(ii).

In the third step of the process II (hereinafter referred to as "step II-(iii)"), the treated water from the step II-(ii) is subjected to aerobic treatment by a conventional activated sludge method. The treatment conditions in the step II-(iii) are not specifically limited, but usually the treating temperature is about 20° to about 40° C., the residence time is about 3 to about 24 hours and the pH is in the neighborhood of neutrality.

The oxygen in the exhaust gas from the oxygen-containing gas used in the step II-(ii) may be used as the oxygen required for aeration in the step II-(iii).

The excess sludge from the step II-(iii) is returned in the fourth step of the process II (hereinafter referred to as "step II-(iv)") to the step II-(i) wherein the sludge is treated again together with the waste water to be initially treated.

(3) Process III

In the first step of the process III (hereinafter referred to as "step III-(i)"), the waste water to be treated is subjected to liquid phase oxidation in the absence of a catalyst and in the presence of an oxygen-containing gas under the same conditions as those in the step I-(i).

In the second step of the process III (hereinafter referred to as "step III-(ii)"), the water from the step III-(i) is subjected again to liquid phase oxidation in the presence of a catalyst which is of the same type as those used in the step I-(ii). The reaction conditions may be the same as those in the step I-(ii).

In the third step of the process III (hereinafter referred to as "step III-(iii)"), the treated water from the step III-(ii) is subjected to digestion by an anaerobic methane fermentation method as done in the step I-(iii).

If the treated water from the step III-(iii) fails to comply with standards for water quality, standards for discharge of waste water or like official standards, the water is subjected to aerobic treatment by a conventional activated sludge method in the fourth step of the process III (hereinafter referred to as "step III-(iv)"). The treatment conditions in the step III-(iv) are not specifically limited but usually the same as in the step II-(iii).

The excess sludge from the steps III-(iii) and III-(iv) is returned to the step III-(i) in the fifth step of the process III (hereafter referred to as "step III-(v)") and is treated again together with the waste water to be initially treated.

In the steps I-(i), I-(ii), II-(i), II-(ii), III-(i) and III-(ii), the liquid phase oxidations favorably proceed when the waste water to be treated or the treated water has a pH of about 5 to about 10, preferably about 6 to about 9. Consequently the waste water to be treated in the step (i) of each process may be adjusted to a suitable pH depending on the kind of waste water, for example, with addition of an alkali substance such as sodium hydroxide, sodium carbonate, calcium hydroxide or the like, an acidic substance such as sulfuric acid. Alternatively the treated water fed to the steps I-(ii), II-(ii) and III-(ii) may be adjusted to a suitable pH before treatment with addition of the alkali substance or acidic substance useful in the step (i) of each process. Even if the starting waste water or treated water before treatment in each step has an initial pH of about 5 to about 10, the pH may markedly decrease with the progress of the reaction, thereby reducing the ratio of decomposition of harmful substances and causing the acidic liquid to erode seriously the reactor, pipes, heat exchanger and the like. To avoid this problem, a suitable amount of the same alkali substance as above is desirably added to the reaction system so that the pH of liquid in the reaction system is kept outside the range of high acidity.

DESCRIPTION OF THE INVENTION WITH REFERENCE TO DRAWINGS

The objects, features and advantages of the invention will become apparent from the following description of the invention with reference to the accompanying drawings which are given for illustrative purposes only and to which the invention is not limited.

Figure 1:
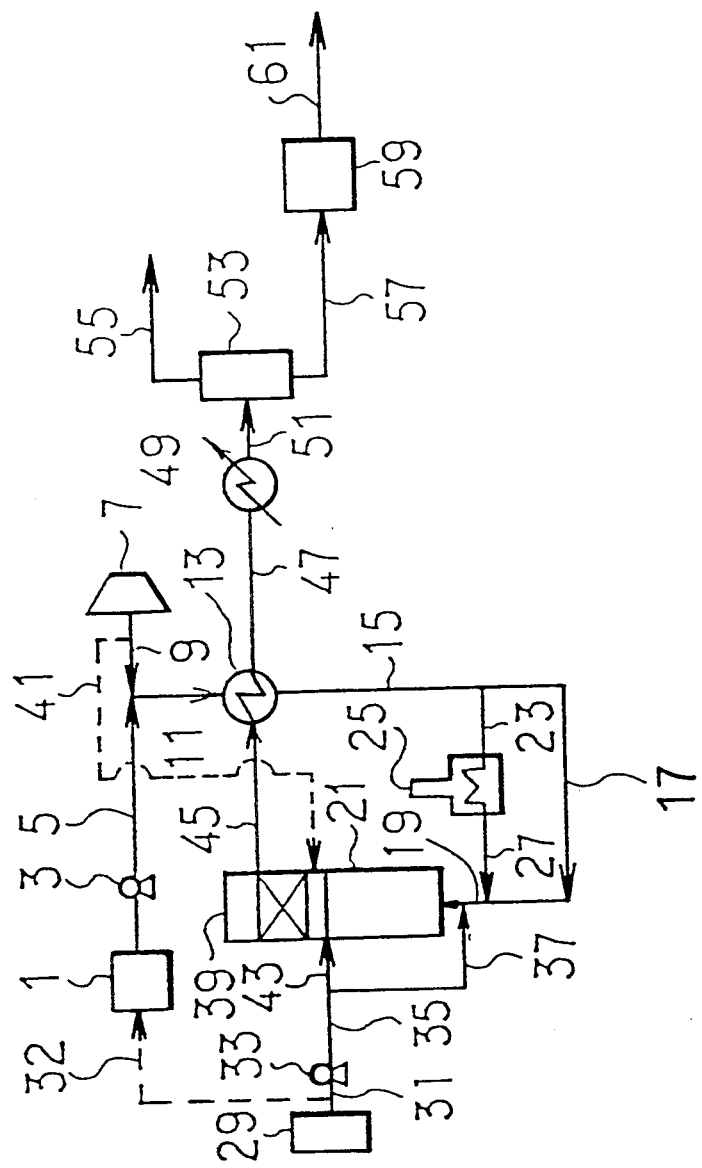
FIG. 1 is a flow chart illustrating one mode of the process I.

Referring to FIG. 1, the waste water containing suspended solids, ammonia and COD components is supplied from a waste water tank 1 under pressure through a line 5 by a pump 3. Then the water is mixed with an oxygen-containing gas pressurized by a compressor 7 and led through a line 9. The mixture is passed via a line 11 and a heat exchanger 13 to a line 15. Coarse solids present in the waste water are preferably removed or crushed before treatment if required. When heated to higher than the predetermined temperature by the heat transfer at the heat exchanger 13, the water is supplied through lines 17 and 19 to a first reactor 21. On the other hand, when remaining at lower than the specified temperature, the water is sent through a line 23 to a heater 25 and admitted via lines 27 and 19 to a first reactor or reaction zone 21. When required, an alkali or acidic substance, which is usually in the form of an aqueous solution, is supplied from a pH regulating substance tank 29 via a line 31, a pump 33 and lines 35 and 37 to join the waste water. The pH regulating substance may be sent to the waste water tank 1 via a line 32 branched from the line 31 to adjust the pH of the waste water. The waste water in the first reactor 21 is subjected to liquid phase oxidation in the absence of a catalyst and in the presence of an oxygen-containing gas.

The treated water flowing out of the first reactor 21 is sent to a second reactor or reaction zone 39 containing a catalyst with its active component supported on a granular carrier wherein the water is subjected again to liquid phase oxidation. The oxygen-containing gas may be supplied from the compressor 7 through a line 41 to the treated water from the first reactor 21. The pH regulating substance may be fed from the tank 29 through the line 31, the pump 33, the line 35 and a line 43 to the treated water. The pH regulating substance may be introduced at a suitable location (not shown) each of the first reactor 21 and the second reactor 39.

The water submitted to liquid phase oxidation in the second reactor 39 is passed through a line 45 into the heat exchanger 13 in which thermal energy is transferred to the untreated waste water. Thereafter the water is admitted via a line 47 to a cooler 49 and cooled therein. When the water passing the line 47 has a temperature of about 50° C., the cooler 49 need not be used. The treated water drawn off from the cooler 49 is conducted via a line 51 to a gas-liquid separator 53 where the treated water is separated into a gas flowing through a line 55 and a liquid flowing though a line 57. When the treated water from the second reaction zone 39 contains incombustible ash, the ash may be removed by a separating membrane, sedimentation separator or the like (not shown) provided on the line 57. The water from the line 57 is sent to an anaerobic methane fermentation tank 59 wherein the water is subjected to digestion. Thereafter the treated water is drawn off from a line 61. The excess sludge produced in the tank 59 is, for example, mixed with the waste water on the line 5 and returned to the first reaction zone 21 wherein the sludge is treated together with the waste water to be initially treated.

In the flow chart of FIG. 1, the process II can be carried out with use of a tank for aerobic treatment by an activated sludge method in place of the anaerobic methane fermentation tank 59. In this case, the gas from the line 55 may be supplied to the aerobic treatment tank for use as at least part of an oxygen source. The excess sludge produced in the aerobic treatment tank is returned to the first reaction zone 21 and treated together with the waste water to be initially treated.

Figure 2:
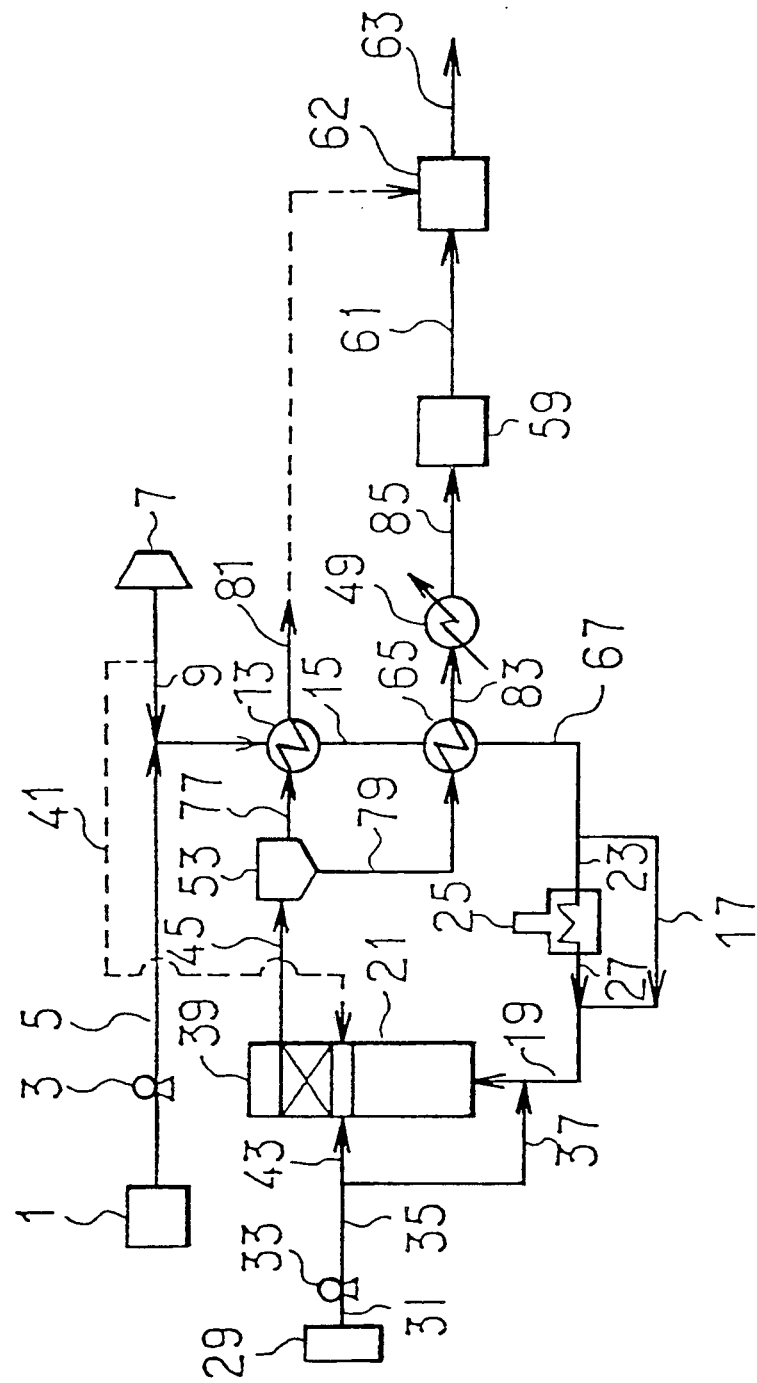
FIG. 2 is a flow chart showing a mode of the process III.

In FIG. 2, the same numerals as used in FIG. 1 denote the same members as a rule. The waste water discharged from a waste water tank 1 is heated by a first heat exchanger 13 and a second heat exchanger 65. The waste water thus heated is passed through a line 67 to a heater 25. The water further heated or not heated by the heater 25 is admitted into a first reactor 21 and subjected to liquid phase oxidation without a catalyst. When required, coarse solids in the waste water may be removed or crushed before treatment as described hereinbefore. The treated water is introduced into a second reactor 39 and submitted to liquid phase oxidation in the presence of a granular catalyst. The treated water flowing out of the second reactor 39 is led through a line 45 to a gas-liquid separator 53 and separated into a gas running via a line 77 and a liquid running via a line 79. The gas flowing through the line 77 is conducted to the heat exchanger 13 to apply thermal energy to the waste water and is drawn off from a line 81. On the other hand, the liquid running in the line 79 is sent to the second heat exchanger 65 to heat further the waste water and is admitted into the anaerobic methane fermentation tank 59 via a line 83 and into the aerobic treatment tank 62 via the line 61 to undergo successive treatments. Thereafter the treated water is withdrawn from the line 63. In this case, the gas from the line 81 may be sent to the aerobic treatment tank 62 for use as part of an oxygen source. The excess sludge produced in the anaerobic methane fermentation tank 59 and the aerobic treatment tank 62 is returned, as done in the process I, to the first reaction zone and treated together with the waste water to be initially treated.

In the process I, the treated water flowing through the line 45 in FIG. 1 may be optionally sent to an equivalent of the gas-liquid separator shown in FIG. 2 and subsequently processed in the same manner as in the mode in FIG. 2. Likewise, in the process III, the treated water flowing via the line 75 in FIG. 2 may be optionally admitted to an equivalent of the heat exchanger 13 shown in FIG. 1 and subsequently processed in the same way as in the mode in FIG. 1.

According to the invention, waste water containing a highly concentrated suspension as well as ammonia and COD components can be efficiently treated. In accordance with the invention, the suspended solids in the waste water are solubilized by the first-stage wet oxidation of waste water in the presence of an oxygen-containing gas and in the absence of a catalyst. Subsequently the nitrogen-containing compounds such as ammonia are decomposed and the suspended solids and COD components are partly decomposed by the second-stage oxidation in the presence of a catalyst and an oxygen-containing gas. At the same time, the organic compounds such as high-molecular substances, biologically scarcely decomposable components and the like are mostly converted into lower aliphatic carbons such as acetic acid, etc. due to the action of the catalyst. The low-molecular weight biologically easily decomposable products in the waste water formed by liquid phase oxidation are efficiently treated by the anaerobic methane fermentation or aerobic treatment or a combination of these treatments.

Consequently the waste water containing highly concentrated suspended solids can be effectively treated according to the invention. For example, waste water is currently treated in sewage treatment plants using an aeration tank for aerobic treatment with such a volume that the residence time of sewage sludge in the tank is approximately 6 to 8 hours according to the standard by the Ministry of Construction. When the excess sludge is treated according to the invention, the residence time of sewage sludge in such tank can be reduced to approximately ⅓.

The decolorization, deodorization and sterilization of waste water can be conducted at the same time according to the invention.

The present invention will be described below in greater detail with reference to the following examples.

EXAMPLE 1

Concentrated sewage sludge was treated by the processes I, II and III according to the flow charts as shown in FIGS. 1 and 2. The sewage sludge to be treated had the composition as shown below in Table 1.

TABLE 1

| | |
|---|---|
| pH | 6.0 |
| $COD_{Mn}$ (mg/l) | 9000 |
| $COD_{Cr}$ (mg/l) | 18500 |
| $NH_3$—N (mg/l) | 750 |
| Total-N (mg/l) | 1960 |
| BOD (mg/l) | 6100 |
| SS (mg/l) | 20900 |
| TOD (mg/l) | 31600 |
| TOC (mg/l) | 6000 |

Step I-(i)

The concentrated sewage sludge was fed to a lower portion of the first reactor 21 at a space velocity of 2.0 l/hr (based on an empty column) and a mass velocity of 7.96 t/m² hr. Air was introduced into the lower portion of the first reactor 21 at a space velocity of 226 l/hr (based on an empty column, under standard conditions). The waste was subjected in the reactor to liquid phase oxidation without a catalyst at a temperature of 250° C. and pressure of 90 kg/cm²·G.

Table 2 below shows the components and properties of the waste thus treated.

TABLE 2

| | |
|---|---|
| pH | 6.0 |
| $COD_{Mn}$ (mg/l) | 2650 |
| $COD_{Cr}$ (mg/l) | 8900 |
| $NH_3$—N (mg/l) | 1500 |
| Total-N (mg/l) | 1900 |
| BOD (mg/l) | 7800 |
| SS (mg/l) | 4580 |
| TOD (mg/l) | 18100 |
| TOC (mg/l) | 4500 |

The comparison between Tables 1 and 2 shows that the $COD_{Mn}$, $COD_{Cr}$, TOD and TOC were decomposed by the liquid phase oxidation without a catalyst at ratios of 70.6%, 51.9%, 42.7% and 25%, respectively. The BOD components were slightly increased in quantity by the liquid phase oxidation. Since the nitrogen-containing compounds were converted into ammonia, the concentration of ammonia was susbtantially doubled.

Step I-(ii)

The waste treated in the step I-(i) was supplied to the second reactor 39 containing a catalyst supported by a granular titania carrier 4 to 6 mm in diameter. The reactor 39 had half the empty column volume of the first reactor 21. The waste was subjected to liquid phase oxidation. The reaction temperature was 270° C. and the pressure was the same as in the step I-(i).

Table 3 below shows the components and properties of the waste thus treated.

TABLE 3

| | |
|---|---|
| pH | 2.8 |
| $COD_{Mn}$ (mg/l) | 700 |
| $COD_{Cr}$ (mg/l) | 4620 |
| $NH_3$—N (mg/l) | 10 |
| Total-N (mg/l) | 15 |
| BOD (mg/l) | 2130 |
| SS (mg/l) | 2190 |
| TOD (mg/l) | 7000 |
| TOC (mg/l) | 2000 |

The comparison between Tables 1 and 3 shows that $COD_{Cr}$ and TOD were decomposed in amounts of 13,880 mg and 24,600 mg per liter of waste water. The reaction was carried out without supply of heat from outside because of the reaction heat emitted by the decomposition of these components and the ammonia component. A heating furnace 25 as shown in the flow chart of FIG. 1 was not needed.

The treated water obtained in the step I-(ii) was cooled at the heat exchanger 13 and at the cooler 49, and fed to the gas-liquid separator 53. The temperature of the water was adjusted by the cooler 49 to bring the temperature thereof to about 55° C. in the anaerobic methane fermentation tank at the ensuing step.

None of $NH_3$, $SO_x$ and $NO_x$ were detected in the exhaust gas from the gas-liquid separator 53.

Step I-(iii)

The treated water from the step I-(ii) was introduced into a sedimentation separator (not shown) to remove the remaining SS portion. Ninety-five % or more of the separated SS was incombustible ash. The water from the sedimentation separator was adjusted to a pH of about 7.5 with a 10% solution of sodium hydroxide and then sent to the anaerobic methane fermentation tank 59. The tank 59 was of the fluidized bed type in which porous ceramic particles of 300 μm diameter with bacteria deposited thereon were suspended by a circulating pump.

Table 4 below shows the quality of water obtained by the anaerobic digestion (result attained by the process I).

The excess sludge from the digestion step was returned to the step I-(i) and treated.

TABLE 4

| | |
|---|---|
| pH | 7.3 |
| $COD_{Mn}$ (mg/l) | 105 |
| $COD_{Cr}$ (mg/l) | 832 |
| $NH_3$—N (mg/l) | 5 |
| Total-N (mg/l) | 8 |
| BOD (mg/l) | 148 |
| SS (mg/l) | 40 |
| TOC (mg/l) | 200 |

Step II-(iii)

The water (SS removed, about 35° C.) treated in the steps II-(i) and II-(ii) in the same manner as done in steps I-(i) and I-(ii) was subjected to aerobic treatment by an activated sludge method.

Table 5 below shows the quality of water (result attained by the process II) obtained by the aerobic treatment.

TABLE 5

| | |
|---|---|
| pH | 7.1 |
| $COD_{Mn}$ (mg/l) | 8 |
| $NH_3$—N (mg/l) | 3 |
| Total-N (mg/l) | 5 |
| BOD (mg/l) | 10 |
| SS (mg/l) | 1 |
| TOC (mg/l) | 10 |

The excess sludge from the aerobic treatment was returned to the step II-(i) and treated again. Step III-(iv)

The water treated in the same manner as in the steps I-(i), I-(ii) and I-(iii) was subjected to aerobic treatment in the activated sludge treatment tank 62.

The quality of water obtained by the aerobic treatment is shown below in Table 6.

TABLE 6

| | |
|---|---|
| pH | 7.0 |
| $COD_{Mn}$ (mg/l) | 6 |
| $NH_3$—N (mg/l) | 3 |
| Total-N (mg/l) | 5 |
| BOD (mg/l) | 9 |
| SS (mg/l) | 1 |
| TOC (mg/l) | 10 |

EXAMPLE 2

Concentrated sewage sludge was treated by the process II according to the flow chart of FIG. 1. The concentrated sewage sludge had the same composition as the sludge treated in Example 1.

The step II-(i) was executed in the same manner as the step I-(i) in Example 1 with the exception of employing a temperature of 260° C. and a pressure of 95 kg/cm²·G.

The step II-(ii) was executed in the same manner as the step I-(ii) in Example 1 with the exception of employing a temperature of 280° C. and a pressure of 95 kg/cm²·G.

The treated water from the step II-(ii) was filtered by a ultrfilter to remove the suspended solids. The residue was adjusted to a pH of 6.8 with a solution of sodium hydroxide and was subjected to aerobic treatment at about 35° C. Ninety-five % of the removed suspended solids was incombustible ash, which was then withdrawn.

Table 7 below shows the quality of water at each outlet of steps.

TABLE 7

| | Outlet of step II-(i) | Outlet of step II-(ii) | Outlet of step II-(iii) |
|---|---|---|---|
| pH | 7.1 | 2.3 | 6.7 |
| COD (mg/l) | 2200 | 91 | 2 |
| $NH_3$—N (mg/l) | 1810 | Trace | Trace |
| Total-N (mg/l) | 2210 | 8 | 5 |
| BOD (mg/l) | 6100 | 120 | 5 |
| SS (mg/l) | 3840 | 1200 | 1 |
| TOD (mg/l) | 11300 | 800 | 15 |
| TOC (mg/l) | 2700 | 230 | 8 |

None of $NH_3$, $SO_x$ and $NO_x$ were detected in the exhaust gas from the gas-liquid separator 53.

The decomposition percentage of components in each step was not reduced even after treatment of concentrated sewage sludge containing highly concentrated suspended solids for a total of 2000 hours. Thus the subsequent treatments were performed without problem.

EXAMPLES 3 TO 12

The same concentrated sewage sludge as used in Example 1 was treated by the process II according to the flow chart of FIG. 2.

The space velocity of liquid was 1.0 l/h in the step II-(i) (based on an empty column) and 1.33 l/h in the step II-(ii) (based on an empty column).

Spherical catalysts shown in Table 8 below were used in the step II-(ii).

The other conditions than the above are the same as those employed in Example 1.

Table 8 also shows the quality of water obtained in the steps II-(ii) and II-(iii).

TABLE 8

| Ex. | Catalyst in step II-(ii) | Outlet of step II-(ii) (mg/l) | | Outlet of step II-(iii) (mg/l) | |
|---|---|---|---|---|---|
| | | COD component | $NH_3$—N | COD component | $NH_3$—N |
| 3 | 2% Rhodium | 201 | 26 | 9 | 8 |
| 4 | 2% Palladium | 110 | 20 | 7 | 6 |
| 5 | 2% Iridium | 101 | 39 | 11 | 8 |
| 6 | 0.5% Platinum | 180 | 29 | 13 | 9 |
| 7 | 10% Cobalt | 230 | 40 | 8 | 15 |
| 8 | 10% Nickel | 460 | 59 | 15 | 40 |
| 9 | 20% Manganese | 303 | 29 | 10 | 20 |
| 10 | 5% Tungsten | 410 | 160 | 20 | 150 |
| 11 | 5% Copper | 590 | 130 | 20 | 120 |
| 12 | 5% Iron | 801 | 190 | 25 | 135 |

We claim:

1. A process for treating waste water by wet oxidations which contains at least two components among suspended solids, ammonia and COD components, the process comprising the steps of;
  (i) subjecting waste water to liquid phase oxidation in the absence of a catalyst and in the presence of an oxygen-containing gas,
  (ii) subjecting the treated water from the step (i) to liquid phase oxidation in the presence of an oxygen-containing gas and a catalyst supported by a granular carrier and comprising at least one of iron, cobalt, manganese, nickel, ruthenium, rhodium, palladium, iridium, platinum, copper, gold and tungsten and compounds thereof insoluble or sparingly soluble in water,
  (iii) subjecting the treated water from the step (ii) to anaerobic digestion by anaerobic methane fermentation, and
  (iv) returning the excess sludge from the step (iii) to the step (i).

2. A process as defined in claim 1 wherein the waste water is subjected to the step (i) at a pH of about 5 to about 10.

3. A process as defined in claim 2 wherein the waste water is subjected to the step (i) at a pH of about 6 to about 9.

4. A process as defined in claim 1 wherein the temperature in the step (i) is about 100° to about 370° C.

5. A process as defined in claim 4 wherein the temperature is about 200° to about 300° C.

6. A process as defined in claim 1 wherein the active component of the catalyst used in the step (ii) is at least one of iron, cobalt, manganese, nickel, ruthenium, rhodium, palladium, iridium, platinum, copper, gold and tungsten.

7. A process as defined in claim 1 wherein the active component of the catalyst used in the step (ii) is at least one of compounds insoluble or sparingly soluble in water of iron, cobalt, manganese, nickel, ruthenium, rhodium, palladium, iridium, platinum, copper, gold and tungsten.

8. A process as defined in claim 7 wherein the active component of the catalyst is at least one of oxides, chlorides and sulfides.

9. A process as defined in claim 1 wherein the temperature in the step (ii) is about 100° to about 370° C.

10. A process as defined in claim 9 wherein the temperature is about 200° to about 300° C.

11. A process as defined in claim 1 wherein the step (iii) is carried out at a temperature of about 35° to about 60° C., a digesting time of about 1 to 30 days and a sludge concentration of about 2 to about 5%.

12. A process for treating waste water by wet oxidations which contains at least two components among suspended solids, ammonia and COD components, the process comprising the steps of;
  (i) subjecting waste water to liquid phase oxidation in the absence of a catalyst and in the presence of an oxygen-containing gas,
  (ii) subjecting the treated water from the step (i) to liquid phase oxidation in the presence of an oxygen-containing gas and a catalyst supported by a granular carrier and comprising at least one of iron, cobalt, manganese, nickel, ruthenium, rhodium, palladium, iridium, platinum, copper, gold and tungsten and compounds thereof insoluble or sparingly soluble in water,
  (iii) subjecting the treated water from the step (ii) to aerobic treatment by an activated sludge method, and
  (iv) returning the excess sludge from the step (iii) to the step (i).

13. A process as defined in claim 12 wherein the waste water is subjected to the step (i) at a pH of about 5 to about 10.

14. A process as defined in claim 13 wherein the waste water is subjected to the step (i) at a pH of about 6 to about 9.

15. A process as defined in claim 12 wherein the temperature in the step (i) is about 100° to about 370° C.

16. A process as defined in claim 15 wherein the temperature is about 200° to about 300° C.

17. A process as defined in claim 12 wherein the active component of the catalyst used in the step (ii) is at least one of iron, cobalt, manganese, nickel, ruthenium, rhodium, palladium, iridium, platinum, copper, gold and tungsten.

18. A process as defined in claim 12 wherein the active component of the catalyst used in the step (ii) is at least one of compounds insoluble or sparingly soluble in water of iron, cobalt, manganese, nickel, ruthenium, rhodium, palladium, iridium, platinum, copper, gold and tungsten.

19. A process as defined in claim 18 wherein the active component of the catalyst is at least one of oxides, chlorides and sulfides.

20. A process as defined in claim 12 wherein the temperature in the step (ii) is about 100° to about 370° C.

21. A process as defined in claim 20 wherein the temperature is about 200° to about 300° C.

22. A process as defined in claim 12 wherein the step (iii) is carried out at a temperature of about 20° to about 40° C. and a residence time of about 3 to 24 hours.

23. A process for treating waste water by wet oxidations which contains at least two components among suspended solids, ammonia and COD components, the process comprising the steps of;
  (i) subjecting waste water to liquid phase oxidation in the absence of a catalyst and in the presence of an oxygen-containing gas,
  (ii) subjecting the treated water from the step (i) to liquid phase oxidation in the presence of an oxygen-containing gas and a catalyst supported by a granular carrier and comprising at least one of iron, cobalt, manganese, nickel, ruthenium, rhodium, palladium, iridium, platinum, copper, gold and tungsten and compounds thereof insoluble or sparingly soluble in water,
  (iii) subjecting the treated water from the step (ii) to anaerobic digestion by anaerobic methane fermentation, and
  (iv) subjecting the treated water from the step (iii) to aerobic treatment by an activated sludge method, and
  (v) returning the excess sludge from the steps (iii) and (iv) to the step (i).

24. A process as defined in claim 23 wherein the waste water is subjected to the step (i) at a pH of about 5 to about 10.

25. A process as defined in claim 24 wherein the waste water is subjected to the step (i) at a pH of about 6 to about 9.

26. A process as defined in claim 23 wherein the temperature in the step (i) is about 100° to about 370° C.

27. A process as defined in claim 26 wherein the temperature is about 200° to about 300° C.

28. A process as defined in claim 23 wherein the active component of the catalyst used in the step (ii) is at least one of iron, cobalt, manganese, nickel, ruthenium, rhodium, palladium, iridium, platinum, copper, gold and tungsten.

29. A process as defined in claim 23 wherein the active component of the catalyst used in the step (ii) is at least one of compounds insoluble or sparingly soluble in water of iron, cobalt, manganese, nickel, ruthenium, rhodium, palladium, iridium, platinum, copper, gold and tungsten.

30. A process as defined in claim 29 wherein the active component of the catalyst is at least one of oxides, chlorides and sulfides.

31. A process as defined in claim 23 wherein the temperature in the step (ii) is about 100° to 370° C.

32. A process as defined in claim 31 wherein the temperature is about 200° to about 300° C.

33. A process as defined in claim 23 wherein the step (iii) is carried out at a temperature of about 35 to about 60° C., a digesting time of about 1 to 30 days and a sludge concentration of about 2 to about 5%.

34. A process as defined in claim 23 wherein the step (iv) is carried out at a temperature of about 20° to about 40° C. and a residence time of about 3 to about 24 hours.

* * * * *